US012072987B1

(12) United States Patent
Manurangsi et al.

(10) Patent No.: US 12,072,987 B1
(45) Date of Patent: Aug. 27, 2024

(54) PRIVATE COUNTING FROM ANONYMOUS MESSAGES: NEAR-OPTIMAL ACCURACY WITH VANISHING COMMUNICATION OVERHEAD

(71) Applicant: Google LLC, Mountain View, CA (US)

(72) Inventors: Pasin Manurangsi, Mountain View, CA (US); Badih Ghazi, San Jose, CA (US); Shanmugasundaram Ravikumar, Piedmont, CA (US); Rasmus Pagh, Hjarup (SE); Amer Sinha, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 393 days.

(21) Appl. No.: 17/227,532

(22) Filed: Apr. 12, 2021

Related U.S. Application Data

(60) Provisional application No. 63/008,332, filed on Apr. 10, 2020.

(51) Int. Cl.
*G06F 21/60* (2013.01)
*G06N 20/00* (2019.01)

(52) U.S. Cl.
CPC ............. *G06F 21/60* (2013.01); *G06N 20/00* (2019.01)

(58) Field of Classification Search
CPC ................................ G06F 21/60; G06N 20/00
See application file for complete search history.

(56) References Cited

U.S. PATENT DOCUMENTS

| 8,301,537 | B1 * | 10/2012 | Rachev | G06Q 40/06 705/37 |
| 10,565,524 | B2 * | 2/2020 | Bellala | G06N 20/00 |
| 2006/0015474 | A1 * | 1/2006 | Aggarwal | G06F 21/6245 |
| 2010/0114840 | A1 * | 5/2010 | Srivastava | G06F 21/6254 707/E17.014 |
| 2010/0138443 | A1 * | 6/2010 | Ramakrishnan | G06F 16/90324 707/769 |
| 2012/0204026 | A1 * | 8/2012 | Shi | H04L 9/3006 713/168 |
| 2015/0370159 | A1 * | 12/2015 | Willson | B82Y 40/00 428/447 |

(Continued)

OTHER PUBLICATIONS

Shi et al., "PriSense: Privacy-Preserving Data Aggregation in People-Centric Urban Sending Systems", TEFE INFOCOM 2010. 10 Pages (Year: 2010).*

(Continued)

*Primary Examiner* — Saleh Najjar
*Assistant Examiner* — Devin E Almeida
(74) *Attorney, Agent, or Firm* — DORITY & MANNING P.A.

(57) ABSTRACT

The present disclosure provides practical communication-efficient and low-error algorithms for aggregation of private data. For example, the proposed algorithms can be implemented in the shuffled DP model. Specific example operations that can be performed using the proposed algorithms include summation (e.g., binary summation, integer summation) and histograms over a moderate number of buckets. The proposed algorithms achieve accuracy that is arbitrarily close to that of central DP algorithms with an expected communication per user essentially matching what is needed without any privacy constraints.

20 Claims, 9 Drawing Sheets

(56) References Cited

U.S. PATENT DOCUMENTS

| | | | |
|---|---|---|---|
| 2020/0285997 A1* | 9/2020 | Bhattacharyya | G06N 7/00 |
| 2021/0243171 A1* | 8/2021 | Ghazi | H04L 63/0421 |
| 2022/0129760 A1* | 4/2022 | Ravikumar | G06F 21/6245 |
| 2022/0374542 A1* | 11/2022 | Ghazi | G06F 21/6245 |

OTHER PUBLICATIONS

Goryczka et al., "Secure multiparty aggregation with differential privacy: a comparative study". In Proceedings of the Joint EDBT/ICDT 2013 Workshops (EDBT '13). Association for Computing Machinery, New York, NYY, USA, 155-163. https://doi.org/10.1145/2457317.2457343 (Year: 2013).*

Abadi et al., "Deep Learning with Differential Privacy", arXiv:1607.00133v2, Oct. 24, 2016, 14 pages.

Abowd, "The U.S. Census Bureau Adopts Differential Privacy", $24^{th}$ ACM SIGKDD Conference on Knowledge Discovery and Data Mining, Aug. 19-23, 2018, London, UK, pp. 2867-2867.

Agarwal et al., "cpSGD: Communication-efficient and differentially-private distributed SGD", Thirty-second Conference on Neural Information Processing Systems, Dec. 2-8, 2018, Montreal, Canada, 12 pages.

Ali et al., "A General Class of Coefficients of Divergence on One Distribution from Another", Journal of the Royal Statistical Society, Series B (Methodolical), vol. 28, Issue 1, 1966, pp. 131-142.

Alistarh et al, "QSGD: Communication-Efficient SGD via Gradient Quantization and Encoding", Thirty-first Conference on Neural Information Processing Systems, Dec. 4-9, 2017, 12 pages.

Apple Differential Privacy Team, "Learning with Privacy at Scale", Apple Machine Learning Journal, 2017, 25 pages.

Balcer et al., "Connecting Robust Shuffle Privacy and Pan-Privacy", ACM-SIAM Symposium on Discrete Algorithms (SODA21), Jan. 10-13, 2021, Virtual Conference, pp. 2384-2403.

Balcer et al., "Separating Local & Shuffled Differential Privacy via Histograms", arXiv:1911.06879v3, Dec. 19, 2019, 13 pages.

Balle et al., "Private Summation in the Multi-Message Shuffle Model", arXiv:2002.00817v2, Nov. 11, 2020, 44 pages.

Balle et al., "The Privacy Blanket of the Shuffle Model", arXiv:1903.02837v2, Jun. 2, 2019, 38 pages.

Barthe et al., "Beyond Differential Privacy: Composition Theorems and Relational Logic for f-divergences between Probabilistic Programs", International Colloquium on Automata, Languages and Programming, Jul. 8-12, 2013, Riga, Latvia, 12 pages.

Bassily et al., "Local, Private, Efficient Protocols for Succinct Histograms", Symposium on the Theory of Computing, Jun. 14-17, 2015, Portland, Oregon, 9 pages.

Bassily et al., "Practical Locally Private Heavy Hitters", Thirty-first Conference on Neural Information Processing Systems, Dec. 4-9, 2017, Long Beach, CA, 9 Pages.

Bassily et al., "Private Empirical Risk Minimization: Efficient Algorithms and Tight Error Bounds", IEEE Annual Symposium on Foundations of Computer Science, Oct. 18-21, 2014, Philadelphia, PA, pp. 464-473.

Beimel et al., "Distributed Private Data Analysis: Simultaneously Solving How and What", International Cryptology Conference, Aug. 17-21, 2008, Santa Barbara, CA, 18 pages.

Biswas et al., "CoinPress: Practical Private Mean and Covariance Estimation", Thirty-fourth Conference on Neural Information Processing Systems, Dec. 6-12, 2020, Virtual Conference, 11 pages.

Bittau et al., "PROCHLO: Strong Privacy for Analytics in the Crowd", ACM Symposium on Operating Principles, Oct. 28-31, 2017, Shanghai, China, 19 pages.

Blum et al., "Practical Privacy: the SuLQ Framework", ACM SIGMOD/PODS 2005 Conference, Jun. 13-16, 2005, Baltimore, Maryland, 15 pages.

Canonne, "A short note on Poisson tail bounds", Computer Science, Columbia University, 2017, 3 pages.

Chan et al., "Optimal Lower Bound for Differentially Private Multi-party Aggregation", The $20^{th}$ Annual European Symposium on Algorithms (ESA), Sep. 10-12, 2012, Ljubljana, Slovenia, pp. 277-288.

Chen et al., "Breaking the Communication-Privacy-Accuracy Trilemma", Thirty-fourth Conference on Neural Information Processing Systems, Dec. 6-12, 2020, Virtual Conference, 13 pages.

Chen et al., "On Distributed Differential Privacy and Counting Distinct Elements", Innovations in Theoretical Computer Science Conference, Jan. 6-8, 2021, Virtual Conference, 18 pages.

Cheu et al., "Distributed Differential Privacy via Shuffling", arXiv:1808.01394v3, May 16, 2019, 42 pages.

Ding et al., "Collecting Telemetry Data Privately", Thirty-first Conference on Neural Information Processing Systems, Dec. 4-9, 2017, Long Beach, CA, 10 pages.

Dwork et al., "Calibrating Noise to Sensitivity in Private Data Analysis", Theory of Cryptography Conference (TCC 2006), Mar. 4-7, 2006, New York, NY, 20 pages.

Dwork et al., "Our Data, Ourselves: Privacy via Distributed Noise Generation", $25^{th}$ International Cryptology Conference, May 28-Jun. 1, 2006, Saint Petersburg, Russia, 18 pages.

Dwork et al., "The Algorithmic Foundations of Differential Privacy", Foundations and Trends in Theoretical Computer Science, vol. 9, Nos. 3-4, 281 pages.

Erlingsson et al., "Amplification by Shuffling: From Local to Central Differential Privacy via Anonymity", arXiv:1811.12469v2, Jul. 26, 2020, 19 pages.

Erlingsson et al., "Encode, Shuffle, Analyze Privacy Revisited: Formalizations and Empirical Evaluation", arXiv:2001.03618v1, Jan. 10, 2020, 23 pages.

Erlingsson et al., "RAPPOR: Randomized Aggregatable Privacy-Preserving Ordinal Response", arXiv:1407.6981v2, Aug. 25, 2014, 14 pages.

Feller, "An Introduction to Probability Theory and Its Applications", John Wiley & Sons, Inc., New York, 1968, 525 pages.

Gaboardi et al., "Locally Private Mean Estimation: Z-test and Tight Confidence Intervals", $22^{nd}$ International Conference on Artificial Intelligence and Statistics (AISTATS), Apr. 16-18, 2019, Okinawa, Japan, 10 pages.

Geng et al., "The Optimal Noise-Adding Mechanism in Differential Privacy", IEEE Transactions on Information Theory, vol. 62, No. 2, Feb. 2016, 27 pages.

Geng et al., "The Staircase Mechanism in Differential Privacy", IEEE Journal of Selected Topics in Signal Processing, vol. 9, No. 7, Oct. 2015, pp. 1176-1184.

Ghazi et al., "On the Power of Multiple Anonymous Messages", arXiv:1908.11358v4, May 19, 2020, 70 pages.

Ghazi et al., "Private Aggregation from Fewer Anonymous Messages", arXiv:1909.11073v2, Oct. 15, 2019, 30 pages.

Ghazi et al., "Private Counting from Anonymous Messages: Near-Optimal Accuracy with Vanishing Communication Overhead", $37^{th}$ International Conference on Machine Learning, Jul. 12-18, 2020, Vienna, Austria, 10 pages.

Ghazi et al., "Pure Differentially Private Summation from Anonymous Messages", arXiv:2002.01919v1, Feb. 5, 2020, 40 pages.

Ghazi et al., "Scalable and Differentially Private Distributed Aggregation in the Shuffled Model", arXiv:1906.08320v3, Dec. 2, 2019, 18 pages.

Ghosh et al., "Universally Utility-Maximizing Privacy Mechanisms", SIAM Journal on Computing, vol. 41, No. 6, 2012, pp. 1673-1693.

Girgis et al., "Shuffled Model of Federated Learning: Privacy, Communication, and Accuracy Trade-offs", arXiv:2008.07180v2, Sep. 23, 2020, 34 pages.

Goryczka et al., "A Comprehensive Comparison of Multiparty Secure Additions with Differential Privacy", IEEE Trans Dependable Secure Comput., vol. 14, No. 5, 2017, 39 pages.

Greenberg, "Apple's 'Differential Privacy' Is About Collecting Your Data—But Not Your Data", Wired, Jun. 13, 2016, 6 pages.

IPUMS, IPUMS USA: Version 10.0, 2020, http://doi.org/10.18128/D010. V10.0, retrieved on May 5, 2021. 2 pages.

IPUMS, IPUMS USA: Version 9.0, 2019, http://doi.org/10.18128/D010.V9.0, retrieved on May 5, 2021, 2 pages.

(56) References Cited

OTHER PUBLICATIONS

Ishai et al., "Cryptography from Anonymity", 2006 47$^{th}$ Annual IEEE Symposium on Foundations of Computer Science (FOCS'06), Oct. 21-24, 2006, 10 pages.

Kairouz et al., "Advances and Open Problems in Federated Learning", arXiv:1912.04977v1, Dec. 10, 2019, 105 pages.

Kaplan et al., "Differentially Private k-Means with Constant Multiplicative Error", Thirty-second Conference on Neural Information Processing Systems, Dec. 2-8, 2018, Montreal, Canada, 11 pages.

Kasiviswanathan et al., "What Can We Learn Privately?", 49$^{th}$ Annual IEEE Symposium on Foundations of Computer Science, Oct. 25-28, 2008, Philadelphia, PA, 31 pages.

Kearns, "Efficient Noise-Tolerant Learning from Statistical Queries", Journal of the ACM, vol. 45, No. 6, Nov. 1998, pp. 983-1006.

Knuth, "The Art of Computer Programming", Second Edition, Addison-Wesley Publishing Company, Massachusetts, 1981, 704 pages.

Konecny et al., "Federated Learning: Strategies for Improving Communication Efficiency", arXiv:1610.05492v1, Oct. 18, 2016, 5 pages.

Kotsogiannis et al., "PrivateSQL: A Differentially Private SQL Query Engine", VLDB Endowment, vol. 12, No. 11, pp. 1371-1384.

Sason et al., "f-Divergence Inequalities", arXiv:1508.00335v7, Dec. 4, 2016, 93 pages.

Seide et al., "1-Bit Stochastic Gradient Descent and its Application to Data-Parallel Distributed Training of Speech DNNs", 15$^{th}$ Annual Conference on the International Speech Communication Association, Sep. 14-18, 2014, 5 pages.

Shankland, "How Google tricks itself to protect Chrome user privacy", CNET, Oct. 31, 2014, 4 pages.

Song et al., "Stochastic gradient descent with differentially private updates", 1$^{st}$ IEEE Global Conference on Signal and Information Processing, Dec. 3-5, 2013, Austin, Texas, pp. 245-248.

Stemmer, "Locally Private k-Means Clustering", 2020 ACM-SIAM Symposium on Discrete Algorithms (SODA), Jan. 5-8, 2020, Salt Lake City, Utah, 12 pages.

Suresh et al., "Distributed Mean Estimation with Limited Communication", 34$^{th}$ International Conference on Machine Learning, Aug. 6-11, 2017, Sydney, Australia, 9 pages.

Vadhan, "The Complexity of Differential Privacy", Springer International Publishing, 2017, pp. 347-450.

Wang et al., "Practical and Robust Privacy Amplification with Multi-Party Differential Privacy", arXiv:1908.11515v1, Aug. 30. 2019.

Warner, "Randomized Response: A Survey Technique for Eliminating Evasive Answer Bias", JASA, vol. 60, No. 309, 1965, pp. 63-69.

Wilson et al., "Differentially Private SQL with Bounded User Contribution", arXiv:1909.01917v3, Nov. 25m, 2019, 21 pages.

Zhang et al., "Information-theoretic lower bounds for distributed statistical estimation with communication constraints", Twenty-seventh Conference on Neural Information Processing Systems, Dec. 5-10, 2013, Lake Tahoe, NV, 9 pages.

\* cited by examiner

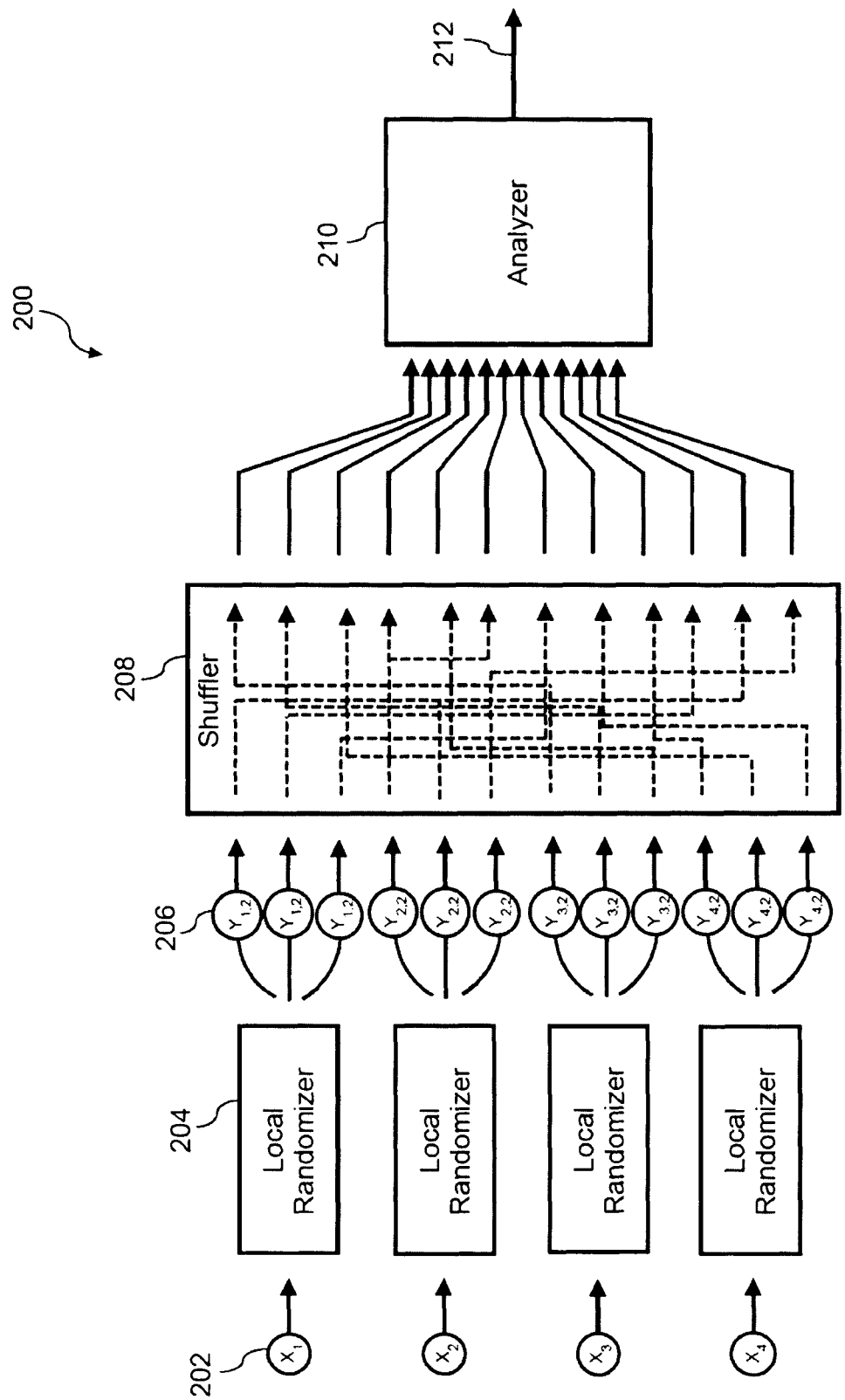

Algorithm 1 $\mathcal{D}$-Distributed Randomizer.

1: procedure RANDOMIZER$_{\mathcal{D},n}(x)$
2:     Sample $Z \sim \mathcal{D}_{/n}$
3:     Send $x + Z$ messages, where each message is 1

Figure 3A

Algorithm 2 $\mathcal{D}$-Distributed Analyzer.

1: procedure ANALYZER$_{\mathcal{D}}$
2:     $U \leftarrow$ number of messages received
3:     return $U - \mathbb{E}[\mathcal{D}]$

Figure 3B

Algorithm 3 $(\mathcal{D}^1, \mathcal{D}^2, \mathcal{D}^3)$-Correlated Distributed Randomizer 1: procedure RANDOMIZER$_{\mathcal{D}^1,\mathcal{D}^2,\mathcal{D}^3,n}(x)$
2:     Sample $Z^1 \sim \mathcal{D}^1_{/n}$
3:     Sample $Z^2 \sim \mathcal{D}^2_{/n}$
4:     Sample $Z^3 \sim \mathcal{D}^3_{/n}$
5:     Send $x + Z^1 + Z^3$ many $+1$ messages.
6:     Send $Z^2 + Z^3$ many $-1$ messages.

Figure 4A

Algorithm 4 $(\mathcal{D}^1, \mathcal{D}^2, \mathcal{D}^3)$-Correlated Distributed Analyzer 1: procedure ANALYZER$_{\mathcal{D}^1,\mathcal{D}^2}$
2:     $U_{+1} \leftarrow$ number of $+1$ messages received.
3:     $U_{-1} \leftarrow$ number of $-1$ messages received.
4:     return $U_{+1} - U_{-1} - \mathbb{E}[\mathcal{D}^1 - \mathcal{D}^2]$

Figure 4B

Algorithm 5 $\Delta$-Summation Randomizer

1: procedure CORRNOISERANDOMIZER$_n(x_i)$
2:    if $x_i \neq 0$
3:       Send $x_i$
4:    Sample $z_i^{+1}, z_i^{-1} \sim \mathcal{D}_{/n}^{\text{central}}$
5:    Send $z_i^{+1}$ copies of $+1$, and $z_i^{-1}$ copies of $-1$
6:    for $s \in \mathcal{S}$
7:       Sample $z_i^s \sim \mathcal{D}_{/n}^s$
8:       for $m \in s$
9:          Send $z_i^s$ copies of $m$

Figure 5A

Algorithm 6 $\Delta$-Summation Analyzer

1: procedure CORRNOISEANALYZER
2:    $R \leftarrow$ multiset of messages received
3:    return $\sum_{y \in R} y$

Figure 5B

PRIVATE COUNTING FROM ANONYMOUS MESSAGES: NEAR-OPTIMAL ACCURACY WITH VANISHING COMMUNICATION OVERHEAD

CROSS-REFERENCE TO RELATED APPLICATIONS

The present application claims filing benefit of U.S. Provisional Patent Application Ser. No. 63/008,332 having a filing date of Apr. 10, 2020, which is incorporated herein by reference in its entirety.

FIELD

The present disclosure relates generally to distributed aggregation. More particularly, the present disclosure relates to scalable and differentially private distributed aggregation, for example, in the shuffled model.

BACKGROUND

Motivated by the need for scalable, distributed privacy-preserving machine learning, there has been an intense interest, both in academia and industry, on designing algorithms with low communication overhead and high accuracy while protecting potentially sensitive, user-specific information.

While many notions of privacy have been proposed, differential privacy (DP) has become by far the most popular and well-studied candidate. Differential privacy (DP) is a formal notion for quantifying the privacy loss of algorithms. Formally, two input datasets $X=(x_1, \ldots, x_n)$ and $X'=(x'_1, \ldots, x'_n)$ are said to be neighboring if and only if they differ on at most a single user's input, i.e., $x_i = x'_i$ for all but one $i \in [n]$. Let $\varepsilon, \delta \in \mathbb{R}_{\geq 0}$. A randomized algorithm $\mathcal{A}$ taking as input a dataset is said to be $(\varepsilon, \delta)$-differentially private $((\varepsilon, \delta)\text{-DP})$ if for any two neighboring datasets X and X', and for any subset S of outputs of $\mathcal{A}$ it holds that $\Pr[\mathcal{A}(X) \in S] \leq e^\varepsilon \cdot \Pr[\mathcal{A}(X') \in S] + \delta$.

Algorithms in the central model of DP achieve high accuracy but make the strongest trust assumptions whereas those in the local DP model make the weakest trust assumptions but incur substantial accuracy loss. Most research has focused on the central model of DP where a curator, who sees the raw user data, is required to release a private data structure. While many accurate DP algorithms have been discovered in this framework, the requirement that the curator observes the raw data constitutes a significant obstacle to deployment in many industrial settings where the users do not necessarily trust the central authority.

To circumvent this limitation, several works have studied the local model of DP, which enforces the more stringent constraint that each message sent from a user device to the server is private. While requiring near-minimal trust assumptions, the local model turns out to inherently suffer from large estimation errors. For numerous basic tasks, including binary summation and histograms, errors are at least on the order of $\sqrt{n}$, where n is the number of users.

The shuffled DP model has recently emerged as a feasible middle ground between the central and local models, providing stronger trust assumptions than the former while promising higher accuracies than the latter. This setting only requires the multiset of anonymized messages that are transmitted by the different users to be private. Equivalently, this corresponds to the setup where a trusted shuffler randomly permutes all incoming messages from the users before passing them to the analyzer. Formally, a protocol over n inputs in the shuffle DP model consists of three procedures. A local randomizer takes an input $x_i$ and outputs a multiset of messages. The shuffler takes the multisets output by the local randomizer applied to each of $x_1, \ldots, x_n$, and produces a random permutation of the messages as output. Finally, the analyzer takes the output of the shuffler and computes the output of the protocol. Privacy in the shuffle model is enforced on the output of the shuffler when a single input is changed.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to enable privacy-preserving aggregation of data. The method includes obtaining, by one or more computing devices, private data comprising a private value. The method includes sampling, by the one or more computing devices, a first random value from a first sampling distribution, wherein the first sampling distribution is a base distribution of a first infinitely divisible distribution. The method includes sampling, by the one or more computing devices, a second random value from a second sampling distribution, wherein the second sampling distribution is a base distribution of a second infinitely divisible distribution. The method includes sampling, by the one or more computing devices, a third random value from a third sampling distribution, wherein the third sampling distribution is a base distribution of a third infinitely divisible distribution. The method includes generating, by the one or more computing devices, a multiset of messages based at least in part on the private value, the first random value, the second random value, and the third random value, wherein the multiset of messages comprises a first number of increment messages equal to a sum of the private value, the first random value, and the third random value, and wherein the multiset of messages comprises a second number of decrement messages equal to a sum of the second random value and the third random value. The method includes providing, by the one or more computing devices, the multiset of messages for aggregation with a plurality of additional multisets of messages respectively generated for a plurality of additional private values.

Another example aspect of the present disclosure is directed to a computer-implemented method for performing aggregation of private values. The method includes receiving a plurality of messages generated by a plurality of client devices, wherein the plurality of messages comprise a total number of increment messages and a total number of decrement messages, wherein a respective device-specific number of the increment messages generated by each client device is equal to a sum of a respective first random value sampled by the client device from a respective first sampling distribution, a respective third sampling value sampled by the client device from a respective third sampling distribution, and a respective private value known by the client device, wherein a respective device-specific number of the increment messages generated by each client device is equal to a sum of a respective second random value sampled from a respective second sampling distribution and the respective third random value, and wherein, for each client device, each of the respective first, second, and third sampling distributions is a respective base distribution of a first infinitely divisible distribution, a second infinitely divisible distribution, and a third infinitely divisible distribution. The method includes determining an expected sampling value for a combination of the first infinitely divisible distribution and the second infinitely divisible distribution. The method includes subtracting the expected sampling value and the total number of decrement messages from the total number of increment messages to produce an aggregate value.

Another example aspect of the present disclosure is directed to a computer-implemented method to enable privacy-preserving aggregation of data. The method includes obtaining, by one or more computing devices, private data comprising a private value. The method includes sampling, by the one or more computing devices, a random value from a sampling distribution, wherein the sampling distribution comprises a base distribution of an infinitely divisible distribution. The method includes generating, by the one or more computing devices, a multiset of messages based at least in part on the private value and the random value, wherein the multiset of messages comprises a number of increment messages equal to a sum of the private value and the random value. The method includes providing, by the one or more computing devices, the multiset of messages for aggregation with a plurality of additional multisets of messages respectively generated for a plurality of additional private values.

Another example aspect of the present disclosure is directed to a computer-implemented method for performing aggregation of private values. The method includes receiving a plurality of messages generated by a plurality of client devices, wherein the plurality of messages comprise a total number of increment messages, wherein a respective device-specific number of the increment messages generated by each client device is equal to a sum of a respective random value sampled by the client device from a respective sampling distribution and a respective private value known by the client device, and wherein, for each client device, the respective sampling distribution is a respective base distribution of an infinitely divisible distribution. The method includes determining an expected sampling value for the infinitely divisible distribution. The method includes subtracting the expected sampling value from the total number of increment messages to produce an aggregate value.

Another example aspect of the present disclosure is directed to a computer-implemented method to enable privacy-preserving aggregation of data. The method includes obtaining, by one or more computing devices, private data comprising a private value. The method includes sampling, by the one or more computing devices, a first random value and a second random value from a first sampling distribution, wherein the first sampling distribution is a base distribution of a first infinitely divisible distribution. The method includes sampling, by the one or more computing devices, a third random value from a second sampling distribution, wherein the second sampling distribution is a base distribution of a second infinitely divisible distribution. The method includes generating, by the one or more computing devices, a multiset of messages based at least in part on the private value, the first random value, the second random value, and the third random value, wherein the multiset of messages comprises a first number of increment messages equal to the first random value, wherein the multiset of messages comprises a second number of decrement messages equal to the second random value, and wherein the multiset of messages comprises a third number of zero sum noise messages. The method includes providing, by the one or more computing devices, the multiset of messages for aggregation with a plurality of additional multisets of messages respectively generated for a plurality of additional private values. In some implementations, the first sampling distribution subtracted from itself comprises a Discrete Laplace distribution. In some implementations, the second sampling distribution comprises a negative binomial distribution. In some implementations, the first number of increment messages and the second number of decrement messages have a sum equal to Discrete Laplacian noise. In some implementations, the private value comprises an integer value in a range from zero to a maximum user value. In some implementations, the zero sum noise messages are selected from a multiset such that values of the multiset are bounded by the maximum user value and such that the sum of all values in the multiset is equal to zero.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example encoding and analysis process for secure multi-party aggregation according to example embodiments of the present disclosure.

FIGS. 3A and 3B depict example implementations of distributed randomizer and analyzer algorithms according to example embodiments of the present disclosure.

FIGS. 4A and 4B depict example implementations of correlated distributed randomizer and analyzer algorithms according to example embodiments of the present disclosure.

FIGS. 5A and 5B depict example implementations of integer summation randomizer and analyzer algorithms according to example embodiments of the present disclosure.

Figure 1:
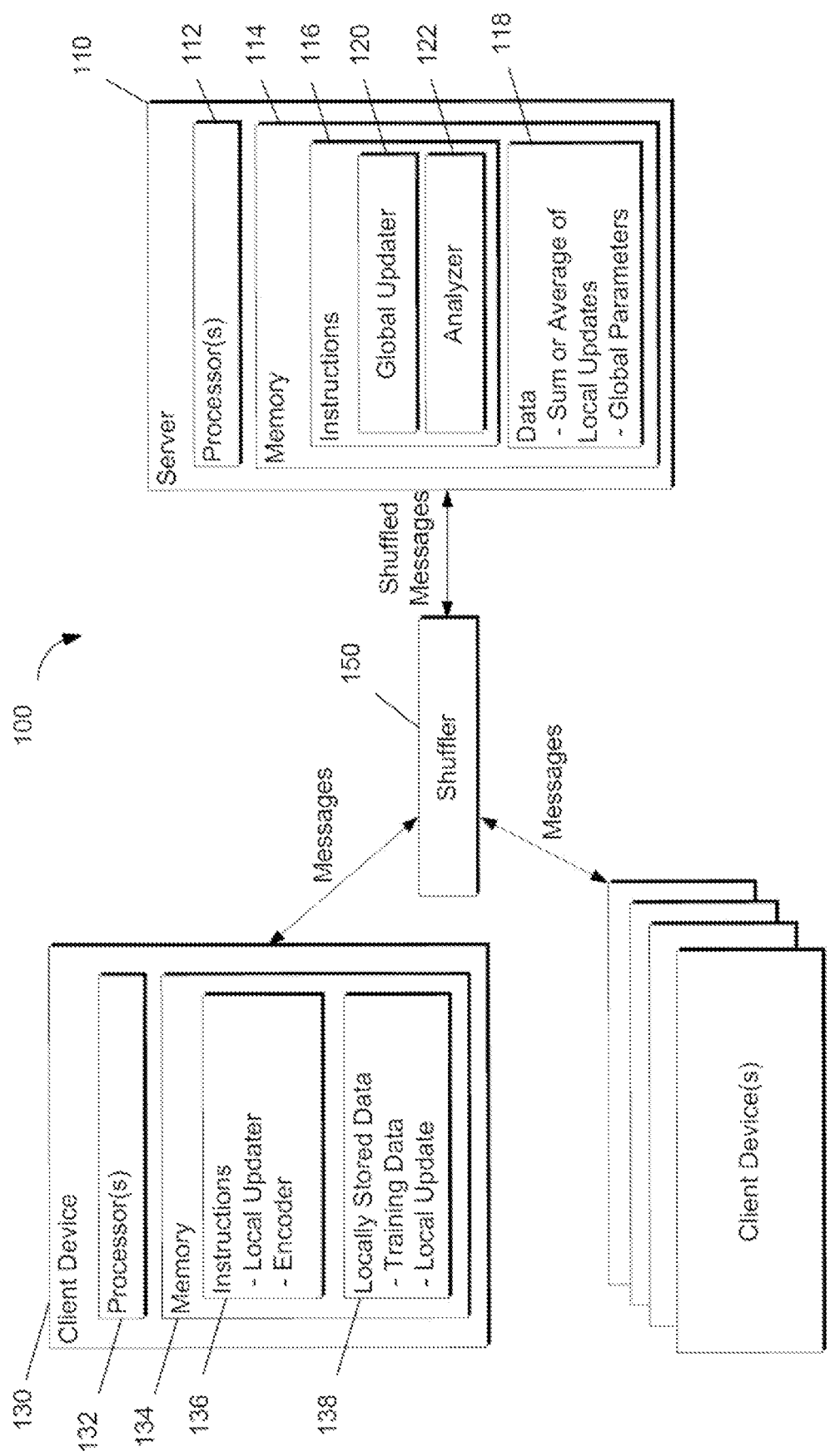
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to practical communication-efficient and low-error algorithms for aggregation of private data. For example, the proposed algorithms can be implemented in the shuffled DP model. Specific example operations that can be performed using the proposed algorithms include summation (e.g., binary summation, integer summation) and histograms over a moderate number of buckets. The proposed algorithms achieve accuracy that is arbitrarily close to that of central DP algorithms with an expected communication per user essentially matching what is needed without any privacy constraints. Systems and methods according to example aspects of the present disclosure can achieve comparable performance to several widely-used protocols such as Randomized Response (Warner, 1965) and RAPPOR (Erlingsson et al., 2014).

In particular, one aspect of the present disclosure provides algorithms (e.g., which can be implemented in the shuffled model) for the binary summation problem. Specifically, each of a number of client devices can hold a private value (e.g., a binary value). Each client device can sample a respective random value from a respective sampling distribution. For instance, for any distribution $\mathcal{D}$, $z \sim \mathcal{D}$, is used to denote a random variable z that is distributed as $\mathcal{D}$, . For two distributions $\mathcal{D}_{,1}$, $\mathcal{D}_{,2}$, let $\mathcal{D}_{,1} + \mathcal{D}_{,2}$ (resp., $\mathcal{D}_{,1} - \mathcal{D}_{,2}$) denote the distribution of $z_1 + z_2$ (resp., $z_1 - z_2$) where $z_1 \sim \mathcal{D}_{,1}$, $z_2 \sim \mathcal{D}_{,2}$ are independent. For $k \in \mathbb{R}_{,}$, we use $k + \mathcal{D}_{,}$ to denote the distribution of $k + z$ where $z \sim \mathcal{D}_{,}$. A random value can be sampled of the random variable and of the respective sampling distribution.

For instance, one of the most basic distributed computation problems is summation (aka. aggregation) where the goal of the analyzer is to estimate the sum of the user inputs. In machine learning, such as in the field of federated learning, private summation provides for private Stochastic Gradient Descent (SGD), which in turn allows the private training of deep neural networks that are guaranteed not to overfit to any user-specific information. Moreover, summation is perhaps the most primitive functionality in database systems in general, such as in private implementations.

A notable special case is binary summation (aka. counting query) where each user holds a bit as an input and the goal of the analyzer is to estimate the number of users whose input equals 1. The vector version of this problem captures, e.g., the case where gradients have been quantized to bits in order to reduce the communication cost (e.g., the 1-bit SGD). Binary summation is of particular interest in machine learning since it is sufficient for implementing any learning algorithm based on statistical queries, which includes most of the known PAC-learning algorithms.

A generalization of the binary summation problem is that of computing histograms (aka. frequency oracles or frequency estimation), where each user holds an element from some finite set $[B] := \{1, \ldots, B\}$ and the goal of the analyzer is to estimate for all $j \in [B]$, the number of users holding element j as input. Computing histograms is fundamental in data analytics and is well-studied in DP, as private histogram procedures can be used as a black-box to solve important algorithmic problems such as heavy hitters as well as unsupervised machine learning tasks such as clustering.

Example aspects of the present disclosure can be particularly beneficial for the regime where B<<n, which captures numerous practical scenarios since the number of buckets is typically small compared to the population size.

According to a typical private binary summation procedures in the central setup, if user i's input is $x_i$, then the analyzer computes the correct sum $\Sigma_{i \in [n]} x_i$ and then adds to it a random variable sampled from some probability distribution $\mathcal{D}$. A common choice of $\mathcal{D}$ is the Discrete Laplace distribution with parameter $\varepsilon$, which yields an ($\varepsilon$, 0)-DP protocol for binary summation with an asymptotically tight MSE of $O(1/\varepsilon^2)$; this is considered optimal in the central DP model. In order to emulate the prototypical central model mechanism in the shuffled model, it is possible to distribute both the signal and the noise over the n users. Distributing the signal can be naturally done by having each user i merely send their true input bit $x_i$. Distributing the noise is significantly more challenging since the shuffled model is symmetric and does not allow coordination of noise across users.

For the binary summation problem, example aspects of the present disclosure provide for a private protocol in the shuffled model achieving mean squared error (MSE) arbitrarily close to the central performance of the Discrete Laplace mechanism while having an expected communication per user of 1+o(1) messages of 1 bit each. For instance, for every $\varepsilon \leq O(1)$ and every $\delta, \gamma \in (0, 1/2)$, there is an ($\varepsilon$, $\delta$)-DP protocol for binary summation in the multi-message shuffled model with error equal to a Discrete Laplace random variable with parameter $(1-\gamma)\varepsilon$ and with an expected communication per user of $$1 + O\left(\frac{\log^2(1/\delta)}{\gamma \varepsilon^2 n}\right)$$

bits. For the standard setting of constant $\varepsilon$ and $\delta$ inverse-polynomial in n and for an arbitrarily small positive constant $\gamma$, the expected communication per user in this result is 1+o(1) bits. Note that 1 bit of communication per user is required for accurate estimation of the binary summation even in the absence of any privacy constraints.

This result can be extended to a protocol for histograms that, with a moderate number of buckets, has error arbitrarily close to the central DP performance of the Discrete Laplace mechanism while using essentially minimal communication. For instance, for every $\varepsilon \leq O(1)$ and every $\delta, \gamma \in (0, 1/2)$, there is an ($\varepsilon$, $\delta$)-DP protocol for histograms on sets of size B in the multi-message shuffled model, with error equal to a vector of independent Discrete Laplace random variables each with parameter $$\frac{(1-\gamma)\varepsilon}{2}$$

and with an expected number of messages sent per user equal to $$1 + O\left(\frac{B \log^2(1/\delta)}{\gamma \varepsilon^2 n}\right),$$

each consisting of $\lceil \log B \rceil + 1$ bits. The expected communication per user in this result is $\lceil \log B \rceil + 1 + o(1)$ bits. Here again, log B bits of communication per user is required for accurate estimation of the histogram even in the absence of any privacy constraints.

The respective sampling distribution for each client device can be a respective base distribution of a shared infinitely divisible distribution. As is known in the art, an infinitely divisible distribution refers to a distribution that is decomposable into the sum of n i.i.d. (not necessarily non-negative) base distributions for any positive integer n. Thus, a shared infinitely divisible distribution can be decomposed to provide each client device with a respective base distribution. Examples of infinitely divisible distributions include the Poisson distribution and the negative binomial distribution. As used herein, a distribution $\mathcal{D}$ over non-negative integers is said to be infinitely divisible if and only if, for every $n \in \mathbb{N}$, there exists a distribution $\mathcal{D}_{/n}$ such that $\mathcal{D}_{/n} + \ldots + \mathcal{D}_{/n}$ is identical to $\mathcal{D}$, where the sum is over n distributions.

One basic discrete non-negative infinitely divisible distribution is the Poisson distribution with parameter $\lambda$, which can be sampled by summing n i.i.d. samples from a Poisson distribution with parameter $\lambda/n$, for any positive integer n. The resulting Poisson mechanism can thus be used as a candidate binary summation procedure in the shuffled model. It turns out that this mechanism is $(\varepsilon, \delta)$-DP if $\lambda$ is set to $$O\left(\frac{\log(1/\delta)}{\varepsilon^2}\right).$$

In this case, the expected communication cost of transmitting the per-user noise is equal to the expectation $\lambda/n$, which is much smaller than 1. It is possible to reduce the communication by considering the Negative Binomial distribution NB(r,p). This distribution is infinitely divisible as a random sample from NB(r,p) can be generated by summing n i.i.d. samples from NB (r/n, p), for any positive integer n. As one example, the negative binomial distribution with parameters r>0, p∈ [0,1], denoted NB(r, p), which has probability mass $$\binom{k+r-1}{k}(1-p)^r p^k$$

at all $k \in \mathbb{Z}_{\geq 0}$, is infinitely divisible; specifically, NB(r, p)$_{/n}$=NB(r/n,p).

Each client device, having obtained a respective random value by sampling its respective sampling distribution, can generate a multiset of messages, where the multiset of messages contains a number of increment messages that is equal to a sum of the device's respective private value and respective random value. The multiset of messages can be transmitted (e.g., in accordance with the shuffled model) for aggregation by an analyzer. One example implementation of this protocol is given in Algorithm 1 of FIG. 3A.

Thus, an analyzer can receive a total number of increment messages from all client devices. The analyzer can determine an expected sampling value for the infinitely divisible distribution and subtract the expected sampling value from the total number of increment messages to produce an aggregate value. One example implementation of this protocol is given in Algorithm 2 of FIG. 3B.

Another example aspect of the present disclosure is directed to a more complex family of protocols that provide lower error and improved privacy relative to the proposed protocols which leverage a single infinitely divisible distribution. Specifically, instead of randomly sampling from a single sampling distribution, each client device can generate a random value from three respective sampling distributions, where each respective sampling distribution is a base distribution from an infinitely divisible distribution. Thus, three infinitely divisible distributions can be used.

Each client device, having obtained respective first, second, and third random values by sampling its respective first, second, and third sampling distributions, can generate a multiset of messages. The multiset of messages can contain a number of increment messages that is equal to a sum of the device's respective private value, first random value, and third random value. In addition, the multiset of messages can further contain a number of decrement messages that is equal to the sum of the second and third random values. The multiset of messages can be transmitted (e.g., in accordance with the shuffled model) for aggregation by an analyzer. One example implementation of this protocol is given in Algorithm 3 of FIG. 4A For instance, in some implementations, each message is one of an increment (e.g., +1) value or a decrement (e.g., -1) value. This template leads to a distributed noise strategy that can achieve near-central accuracy. The Discrete Laplace distribution with parameter & is the same as the distribution of the difference of two independent NB(1, $e^{-\varepsilon}$) random variables, and is thus infinitely divisible. This noise can be distributed in the shuffled model by letting each user sample two independent random variables $Z^1$ and $Z^2$ from NB(1/n, $e^{-\varepsilon}$), and send $Z^1$ increment messages and $Z^2$ decrement messages to the shuffler. This mechanism would achieve the same error as the central Discrete Laplace mechanism. However, since the analyzer can still see the number of increment messages, this scheme is no more private than the (non-negative) mechanism with noise distribution NB(1, $e^{-\varepsilon}$), and thus may not be $(\varepsilon, \delta)$-DP. To leverage the power of sending both positive and negative messages, it is thus desirable to correlate the input-dependent and noise components sent by the users so that the analyzer is unable to extract much information about the user inputs from one type of messages. One manner to do so by employing a unary version of the split-and-mix procedure. Namely, in addition to the aforementioned random variables $Z^1$ and $Z^2$, each user will independently sample a third random variable $Z^3$ from another infinitely divisible distribution, and will send $Z^1+Z^3$ increment messages and $Z^2+Z^3$ decrement messages. Note that in this case, when $Z^3$ is sufficiently "spread out", the analyzer cannot extract much information from counting the number of increments alone, since the noise from $Z^3$ already overwhelms the user inputs. Thus, for some infinitely divisible noise distributions, the resulting mechanism is $(\varepsilon, \delta)$-DP and incurs an error that can be made arbitrarily close to that of the central Discrete Laplace mechanism, while incurring an expected communication overhead per user that goes to 0 with as n increases.

The analyzer can receive all of the messages (both increment and decrement). The analyzer can determine an expected sampling value for a combination of the first infinitely divisible distribution and the second infinitely divisible distribution. For example, the expected sampling value can be an expected value for a difference between the first infinitely divisible distribution and the second infinitely divisible distribution. The analyzer can subtract the expected sampling value and the total number of decrement messages from the total number of increment messages to produce an aggregate value. One example implementation of this protocol is given in Algorithm 4 of FIG. 4B For instance, one example aspect of the present disclosure provides for a computer-implemented method for performing aggregation of private values. The method can include receiving a plurality of messages generated by a plurality of client devices, wherein the plurality of messages include a total number of increment messages, wherein a respective device-specific number of the increment messages generated by each client device is equal to a sum of a respective random value sampled by the client device from a respective sampling distribution and a respective private value known by the client device, and wherein, for each client device, the respective sampling distribution is a respective base distribution of an infinitely divisible distribution. The method can include determining an expected sampling value for the infinitely divisible distribution. The method can include subtracting the expected sampling value from the total number of increment messages to produce an aggregate value.

Additionally, another example aspect of the present disclosure provides for a computer-implemented method for performing aggregation of private values. The method can include receiving a plurality of messages generated by a plurality of client devices, wherein the plurality of messages include a total number of increment messages and a total number of decrement messages, wherein a respective device-specific number of the increment messages generated by each client device is equal to a sum of a respective first random value sampled by the client device from a respective first sampling distribution, a respective third sampling value sampled by the client device from a respective third sampling distribution, and a respective private value known by the client device, wherein a respective device-specific number of the increment messages generated by each client device is equal to a sum of a respective second random value sampled from a respective second sampling distribution and the respective third random value, and wherein, for each client device, each of the respective first, second, and third sampling distributions is a respective base distribution of a first infinitely divisible distribution, a second infinitely divisible distribution, and a third infinitely divisible distribution. The method can include determining an expected sampling value for a combination of the first infinitely divisible distribution and the second infinitely divisible distribution. The method can include subtracting the expected sampling value and the total number of decrement messages from the total number of increment messages to produce an aggregate value.

In some implementations, a combination of the first infinitely divisible distribution and the second infinitely divisible distribution produces a combined distribution that has both positive and negative support. For example, the combination of the first infinitely divisible distribution and the second infinitely divisible distribution can be a difference between the first infinitely divisible distribution and the second infinitely divisible distribution. As one example implementation that is particularly beneficial, the first and second infinitely divisible distributions can be negative binomial distributions that are equal to each other, such that their difference produces a Discrete Laplace distribution with both positive and negative support.

Additional example aspects of the present disclosure extend these protocols to an ordered plurality of values (e.g., a vector of status values). For example, s can be generated by performing binary summation for each of a number of buckets. Example implementations can extend the protocols to multiple values by performing the protocol for each value independently (e.g., and computationally in parallel). An index value can be affixed or concatenated to each message to indicate which bucket the message corresponds to.

Yet additional aspects provide for improved parallelization of the proposed techniques. For example, since, in some example extensions of the proposed algorithms, a large portion of the sampled random values may equal zero, the inefficiency of actively sampling these zero-valued random values can be eliminated by performing efficient sampling in which random values are sampled only for some subset of the values to be aggregated, e.g., with the identity and/or number of values included in this subset being randomly selected according to a fourth sampling distribution.

Additional aspects provide for extension of these algorithms to summation problems beyond binary summation. For instance, another example aspect of the present disclosure is directed to a computer-implemented method to enable privacy-preserving aggregation of data. The method includes obtaining, by one or more computing devices, private data comprising a private value. The method includes sampling, by the one or more computing devices, a first random value and a second random value from a first sampling distribution, wherein the first sampling distribution is a base distribution of a first infinitely divisible distribution. The method includes sampling, by the one or more computing devices, a third random value from a second sampling distribution, wherein the second sampling distribution is a base distribution of a second infinitely divisible distribution. The method includes generating, by the one or more computing devices, a multiset of messages based at least in part on the private value, the first random value, the second random value, and the third random value, wherein the multiset of messages comprises a first number of increment messages equal to the first random value, wherein the multiset of messages comprises a second number of decrement messages equal to the second random value, and wherein the multiset of messages comprises a third number of zero sum noise messages. The method includes providing, by the one or more computing devices, the multiset of messages for aggregation with a plurality of additional multisets of messages respectively generated for a plurality of additional private values. In some implementations, the first sampling distribution subtracted from itself comprises a Discrete Laplace distribution. In some implementations, the second sampling distribution comprises a negative binomial distribution. In some implementations, the first number of increment messages and the second number of decrement messages have a sum equal to Discrete Laplacian noise. In some implementations, the private value comprises an integer value in a range from zero to a maximum user value. In some implementations, the zero sum noise messages are selected from a multiset such that values of the multiset are bounded by the maximum user value and such that the sum of all values in the multiset is equal to zero.

A principal goal within trustworthy machine learning is the design of privacy-preserving algorithms. In recent years, differential privacy (DP) has gained significant popularity as a privacy notion due to the strong protections that it ensures. DP properties are often expressed in terms of parameters $\varepsilon$ and $\delta$, with small values indicating that the algorithm is less likely to leak information about any individual within a set of n people providing data. It is common to set $\varepsilon$ to a small positive constant (e.g., 1), and $\delta$ to inverse-polynomial in n.

DP can be enforced for any statistical or machine learning task, and it is particularly well-studied for the real summation problem, where each user i holds a real number $x_i \in [0,1]$, and the goal is to estimate $\Sigma_i x_i$. This constitutes a basic building block within machine learning, with extensions including (private) distributed mean estimation, stochastic gradient descent, and clustering. For instance, communication-efficient private aggregation is a core primitive in federated learning. It is also naturally related to mean estimation in distributed models of DP. Additionally, communication efficiency is a common requirement in distributed learning and optimization, and substantial effort is spent on compression of the messages sent by users, through multiple methods including hashing, pruning, and quantization.

For instance, the real summation problem has been well-studied in several models of DP. In the central model where a curator has access to the raw data and is required to produce a private data release, the smallest possible absolute error is known to be $O(1/\varepsilon)$. This can be achieved via the ubiquitous Laplace mechanism, which is also known to be nearly optimal for the most interesting regime of $\varepsilon \leq 1$. In contrast, for the more privacy-stringent local setting where each message sent by a user is supposed to be DP, the smallest error is known to be $\Theta_\varepsilon(\sqrt{n})$. This significant gap between the achievable central and local utilities has motivated the study of intermediate models of DP.

The shuffle model reflects the setting where the user reports are randomly permuted before being passed to the analyzer. For instance, a trusted shuffler can receive a plurality of messages (e.g., multisets of messages) from a plurality of users, then randomly permutes all incoming messages from the users before passing them to the analyzer. Several efficient implementations of the shuffler have been considered including mixnets, onion routing, secure hardware, and third-party servers. Any suitable shuffler can be utilized in accordance with example aspects of the present disclosure, and/or the shuffler can be treated as a black box. Two variants of the shuffle model have been studied: in the multi-message case, each user can send multiple messages to the shuffler, and in the single-message setting each user sends one message.

For the real summation problem, it is known that the smallest possible absolute error in the single-message shuffle model is $\tilde{\Theta}(n^{1/6})$. In contrast, multi-message shuffle protocols exist with a near-central accuracy of $O(1/\varepsilon)$, but they suffer several drawbacks in that the number of messages sent per user is required to be at least 3, each message has to be substantially longer than in the non-private case, and in particular, the number of bits of communication per user has to grow with $\log(1/\delta)/\log n$. This (at least) 3-fold communication blow-up relative to a non-private setting can be a limitation in real-time reporting use cases (where encryption costs could be dominant) and in federated learning settings (where great effort is undertaken to compress the gradients). According to example aspects of the present disclosure, however, near-central accuracy and near-zero communication overhead are possible for real aggregation over sufficiently many users.

In particular, example aspects of the present disclosure provide that, for any $0<\varepsilon\leq O(1)$, $\zeta$, $\delta \in (0,1/2)$, there is an $(\varepsilon, \delta)$-DP real summation protocol in the shuffle model whose mean squared error (MSE) is at most the MSE of the Laplace mechanism with parameter $(1-\zeta)\varepsilon$, each user sends $$1 + \tilde{O}_{\zeta,\varepsilon}\left(\frac{\log(1/\delta)}{\sqrt{n}}\right)$$

messages in expectation, and each message contains $$\frac{1}{2}\log n + O\left(\log\frac{1}{\zeta}\right)$$

bits. Note that $\tilde{O}_{\zeta,\varepsilon}$ hides a small poly(log n, $1/\varepsilon$, $1/\zeta$) term. Moreover, the number of bits per message is equal, up to lower order terms, to that needed to achieve MSE $O(1)$ even without any privacy constraints.

This guarantee follows from an analogous result for the case of integer aggregation, where each user is given an element in the set $\{0,1,\ldots,\Delta\}$ (with $\Delta$ an integer, referred to herein as a maximum user value), and the goal of the analyzer is to estimate the sum of the users' inputs. This task is referred to as the $\Delta$-summation problem. Note that the case where $\Delta=1$ can also be referred to as the binary summation problem. For $\Delta$-summation, the standard mechanism in the central model is the Discrete Laplace (aka Geometric) mechanism, which first computes the true answer and then adds to it a noise term sampled from the Discrete Laplace distribution with parameter $\varepsilon/\Delta$. Systems and methods according to example aspects of the present disclosure achieve an error arbitrarily close to this mechanism in the shuffle model, with minimal communication overhead. For instance, according to example aspects of the present disclosure, for any $0<\varepsilon\leq O(1)$, $\gamma$, $\delta \in (0,1/2)$, $\Delta \in \mathbb{N}$, there is an $(\varepsilon, \delta)$-DP $\Delta$-summation protocol in the shuffle model whose MSE is at most that of the Discrete Laplace mechanism with parameter $(1-\gamma)\varepsilon/4$, and where each user sends $$1 + \tilde{O}\left(\frac{\Delta\log(1/\delta)}{\gamma\varepsilon n}\right)$$

messages in expectation, with each message containing $\lceil \log \Delta \rceil +1$ bits. Note that the $\tilde{O}(\cdot)$ hides a poly log $\Delta$ factor. Additionally, note that the number of bits per message in the protocol is within a single bit from the minimum message length needed to compute the sum without any privacy constraints. Incidentally, for $\Delta=1$, this result improves the communication overhead obtained by existing art $$O\left(\frac{\log^2(1/\delta)}{\varepsilon^2 n}\right) \text{ to } O\left(\frac{\log^2(1/\delta)}{\varepsilon n}\right).$$

This improvement is significantly beneficial in practice.

Furthermore, according to example aspects of the present disclosure, the following corollary holds for the 1-sparse vector summation problem, where each user is given a 1-sparse (possibly high-dimensional) vector of norm at most 1, and the goal is to compute the sum of all user vectors with minimal $\ell_2$ error. In particular, for every $d \in \mathbb{N}$, and $0<\varepsilon\leq O(1)$, $\zeta$, $\delta \in (0,1/2)$, there is an $(\varepsilon, \delta)$-DP algorithm for 1-sparse vector summation in d dimensions in the shuffle model whose $\ell_2$ error is at most that of the Laplace mechanism with parameter $(1-\zeta)\varepsilon/2$, and where each user sends $$1 + \tilde{O}_{\zeta,\varepsilon}\left(\frac{d\log(1/\delta)}{\sqrt{n}}\right)$$

messages in expectation, and each message contains $$\log d + \frac{1}{2}\log n + O\left(\log\frac{1}{\zeta}\right)$$

bits.

Example aspects of the present disclosure may be discussed herein with reference to the Δ-summation protocol for the purposes of illustration. One of ordinary skill in the art should understand that aspects discussed with respect to Δ-summation can be extended to any real summation protocol, such as by randomized discretization techniques. Example aspects of the present disclosure are intended to encompass protocols other than Δ-summation when appropriate.

The shuffle or shuffled model of differential privacy is useful due to it being a middle ground between the well-studied central and local models. Example aspects of the present disclosure can be beneficial for summing or aggregating real numbers or integers, which is as a basic primitive in numerous machine learning tasks, in the shuffle model. Example aspects of the present disclosure can provide for a protocol achieving error arbitrarily close to that of the (Discrete) Laplace mechanism in central differential privacy, while each user only sends 1+o(1) short messages in expectation.

Achieving a similar performance to the central-DP Discrete Laplace mechanism in the shuffle model presents challenges. For instance, added noise has to be divided among all users, instead of being added centrally. Fortunately, this can be solved through the infinite divisibility of some distributions, such as Discrete Laplace distributions. For instance, there is a distribution $\mathcal{D}$ ' for which, if each user i samples a noise $z_i$ independently from $\mathcal{D}$ ', then $z_1 + \ldots + z_n$ has the same distribution as DLap(ε/Δ). To implement the above idea in the shuffle model, each user has to be able to send their noise $z_i$ to the shuffler. This noise can be sent in unary, i.e., if $z_i > 0$, the +1 (increment) message can be sent $z_i$ times and, otherwise, the −1 (decrement) message can be sent $-z_i$ times. This is in addition to user i sending their own input $x_i$ if it is non-zero. The analyzer can then sum up all the messages from the user(s).

Unfortunately, this zero-sum noise approach may not be shuffle-DP for Δ>1 because, even after shuffling, the analyzer can still see $u_j$, the number of messages j, which is exactly the number of users whose input is equal to j for j∈{2, . . . , Δ}. To overcome this issue, noise can be implemented at the values $u_j$ themselves, while at the same time preserving the accuracy. This can be achieved by making some users send additional messages whose sum is equal to zero; e.g., a user may send {−1, −1, +2} in conjunction with previously described messages. Since the analyzer sums up all the messages, this additional zero-sum noise still does not affect accuracy. For instance, notice that the analyzer still sees the number of messages $u_j$'s, which are now highly correlated due to the zero-sum noise added. This is unlike most DP algorithms where noise terms are added independently to each coordinate. Thus, by a careful change of basis, the view can be reduced to the independent-noise case.

For instance, consider the case where Δ=2. In this case, there are two zero-sum "noise atoms" that a user might send: (−1, +1) and (−1, −1, +2). These two kinds of noise are sent independently, i.e., whether the user sends (−1, +1) does not affect whether (−1, −1, +2) is also sent. After shuffling, the analyzer sees ($u_{-1}$, $u_{+1}$, $u_{+2}$). Observe that there is a one-to-one mapping between this and ($v_1$, $v_2$, $v_3$) defined by $v_1 := u_{-1} - 2 \cdot u_{+2}$, $v_2 := u_{-1} - u_{+1} - u_{+2}$, $v_3 := -u_{-1} + u_{+1} + 2 \cdot u_{+2}$, meaning that the privacy of each is related. Consider the effect of sending the (+1, −1) noise: $v_1$ is increased by one, whereas $v_2$, $v_3$ are completely unaffected. Similarly, when (−1, −1, +2) noise is sent, $v_2$ is increased by one, whereas $v_1$, $v_3$ are completely unaffected. Hence, the noise added to $v_1$, $v_2$ are independent. Finally, $v_3$ is exactly the sum of all messages, which was noised by the DLap noise explained earlier.

One example aspect of the present disclosure provides a protocol for Δ-summation that is private in the shuffle DP model. In the protocol, the randomizer will send a multiset of messages, each of which is an integer in {−Δ, . . . , +Δ}. The analyzer sums up all the incoming messages. The messages sent from the randomizer can be categorized into three classes. A first class can be the input class. For instance, each user (e.g., user device) i will send its private value $x_i$ if it is non-zero. A second class can be the central noise class. This can include the noise whose sum is equal to the Discrete Laplace noise used in algorithms in the central DP model. This noise is sent in "unary" as +1 or −1 messages. Finally, a third class can be zero-sum noise. In effect, the messages are "flooded" with noise that cancels out. This noise comes from a carefully chosen sub-collection $\mathcal{S}$ of the collection of all multisets of {−Δ, . . . , +Δ}\{0} whose sum of elements is equal to zero (e.g., {−1, −1, +2} may belong to $\mathcal{S}$. Each s∈ $\mathcal{S}$ (e.g., each valid set of integers comprising a zero-sum message) can be referred to herein as a noise atom. For instance, the zero sum noise messages can be selected from a multiset of candidate sets such that values of the multiset are bounded by the maximum user value and such that the sum of all values in the multiset is equal to zero. Additionally, the multiset may exclude zero values.

One example implementation of this protocol is given in Algorithm 5 of FIG. 5A and Algorithm 6 of FIG. 5B, which are referred to as the Correlated Noise mechanism. The protocol is specified by the following infinitely divisible distributions over $\mathbb{Z}_{\geq 0}$: the "central" noise distribution $\mathcal{D}^{central}$, and for every s∈ $\mathcal{S}$,, the "flooding" noise distribution $\mathcal{D}^s$. Note that since s is a multiset, Line 8 of Algorithm 1 goes over each element the same number of times it appears in s; e.g., if s={−1, −1, +2}, the iteration m=−1 is executed twice. It is noted that the mean squared error (MSE) of this protocol is 2Var($\mathcal{D}^{central}$). Furthermore, the distribution $\mathcal{D}^{central}$ in some implementations may not necessarily be the Discrete Laplace distribution. For instance, in some implementations, the distribution $\mathcal{D}^{central}$ is selected so that $\mathcal{D}^{central} - \mathcal{D}^{central}$ is DLap. As a result, 2Var($\mathcal{D}^{central}$) is indeed equal to the variance of the Discrete Laplace noise. Furthermore, it is noted that each user sends at most $$1 + \frac{1}{n}\left(2\mathbb{E}[\mathcal{D}^{central}] + \sum_{s\in\mathcal{S}}|s|\cdot\mathbb{E}[\mathcal{D}^s]\right)$$

messages in expectation, each comprising ⌈log Δ⌉+1 bits.

The systems and methods of the present disclosure provide a number of technical effects and benefits, including, as one example, reducing probability of a privacy failure event associated with secure aggregation of private data. In particular, the systems and methods described herein can provide for a technique for use with the shuffled model, which can prevent an adversary, especially an adversarial analyzer, from learning any and/or all of the private data. For example, the privacy analysis for many existing secure aggregation protocols assumes of an "honest but curious" server that does not deviate from the protocol, so some level of trust in the secure aggregation server is required. In contrast, protocols based on shuffling operate with much weaker assumptions on the server. In addition to this advantage, along with providing differential privacy guarantees, the proposed protocols provide improved communication efficiency and reduced errors. Thus, secure aggregation can be performed with reduced communication costs. Reduced communication costs can conserve computing resources such as processor usage, memory usage, network bandwidth, and the like.

With reference now to the Figures, example embodiments of the present disclosure will be discussed in further detail.

Example Devices and Systems

FIG. 1 depicts an example computing system 100 that can be used to implement one example application of the methods and systems of the present disclosure in the federated learning context. Federated learning is provided as one example only, the proposed aggregation techniques can be applied to many other different problems/applications. The system 100 can be implemented using a client-server architecture that includes a server 110 that communicates with one or more client devices 130 and/or a shuffler 150 over a network.

Each client device 130 can include one or more processor(s) 132 and a memory 134. The one or more processor(s) 132 can include, for example, one or more central processing units (CPUs), graphics processing units (GPUs) dedicated to efficiently rendering images or performing other specialized calculations, and/or other processing devices. The memory 134 can include one or more computer-readable media and can store information accessible by the one or more processors 132, including instructions 136 that can be executed by the one or more processors 132 and data 138.

The instructions 136 can include instructions for implementing a local updater configured to determine one or more local updates to a machine-learned model (e.g., a set of values descriptive of changes to the model parameters based on a set of locally stored training data). For example, the local updater can perform one or more training techniques such as, for example, backwards propagation of errors to re-train or otherwise update the model based on the locally stored training data. The local updater can be included in an application or can be included in the operating system of the device 130.

The locally stored data 138 such as the local update can be considered private data. The local update is used only as one example of private data that can be securely aggregated. Any form of private data can be securely aggregated according to the described techniques.

The instructions 136 can further include instructions for implementing a randomizer or encoder to randomize/encode the private data such as the local update. For example, the randomizer/encoder can perform one or more of the randomizing/encoding techniques described herein. In particular, the randomizer can randomize the private data into a multiset comprising a plurality of multiset values or messages and the messages can be transmitted to a shuffler 150.

The client device 130 of FIG. 1 can include various input/output devices for providing and receiving information from a user, such as a touch screen, touch pad, data entry keys, speakers, and/or a microphone suitable for voice recognition.

The client device 130 can also include a network interface used to communicate with one or more remote computing devices (e.g. server 110) over the network. The network interface can include any suitable components for interfacing with one more networks, including for example, transmitters, receivers, ports, controllers, antennas, or other suitable components.

The shuffler 150 can receive a respective plurality of messages from each of the client devices 130 and can randomly shuffle them so that the messages are randomly distributed amongst each other without regard to which of the plurality of different devices 130 generated each message. In some implementations, multiple shufflers can be used (e.g., sequentially) to provide added layer(s) of privacy assurance.

The system 100 also includes a server 110, such as a web server. The server 110 can be implemented using any suitable computing device(s). The server 110 can have one or more processors 112 and one or more memory devices 114. The server 110 can be implemented using one server device or a plurality of server devices. In implementations in which a plurality of devices is used, such plurality of devices can operate according to a parallel computing architecture, a sequential computing architecture, or a combination thereof.

The server 110 can also include a network interface used to communicate with one or more client devices 130 over the network. The network interface can include any suitable components for interfacing with one more networks, including for example, transmitters, receivers, ports, controllers, antennas, or other suitable components.

The one or more processors 112 can include any suitable processing device, such as a microprocessor, microcontroller, integrated circuit, logic device, or other suitable processing device. The one or more memory devices 114 can include one or more computer-readable media, including, but not limited to, non-transitory computer-readable media, RAM, ROM, hard drives, flash drives, or other memory devices. The one or more memory devices 114 can store information accessible by the one or more processors 112, including computer-readable instructions 116 that can be executed by the one or more processors 112.

The instructions 116 can be any set of instructions that when executed by the one or more processors 112, cause the one or more processors 112 to perform operations. For instance, the instructions 116 can be executed by the one or more processors 112 to implement a global updater 120. The global updater 120 can be configured to update a global model based at least in part on a sum or average of local updates computed at the client devices 130.

The instructions 116 can further include instructions that cause the server 110 to implement an analyzer 122. The analyzer 122 can determine the sum or average of local updates based on the shuffled messages. The analyzer 122 can perform any of the analysis techniques described herein.

As shown in FIG. 1, the one or more memory devices 114 can also store data 118 that can be retrieved, manipulated, created, or stored by the one or more processors 112. The data 118 can include, for instance, local updates, global parameters, and other data. The data 118 can be stored in one or more databases. The one or more databases can be connected to the server 110 by a high bandwidth LAN or WAN, or can also be connected to server 110 through the network. The one or more databases can be split up so that they are located in multiple locales.

The server 110 can exchange data with one or more client devices 130 and/or shuffler 150 over the network. Any number of client devices 130 can be connected to the server 110 and/or shuffler 150 over the network. Each of the client devices 130 can be any suitable type of computing device, such as a general purpose computer, special purpose computer, laptop, desktop, mobile device, navigation system, smartphone, tablet, wearable computing device, gaming console, a display with one or more processors, or other suitable computing device.

The network can be any type of communications network, such as a local area network (e.g. intranet), wide area network (e.g. Internet), cellular network, or some combination thereof. The network can also include a direct connection between a client device 130 and the server 110. In general, communication between the server 110 and a client device 130 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Example Shuffled Model

FIG. 2 depicts a block diagram of an example shuffled model 200 according to example embodiments of the present disclosure. Generally (e.g., as depicted in FIG. 2), a protocol P in the shuffled model can include a randomizer algorithm R (e.g., randomizer 204), a shuffler algorithm S (e.g., shuffler 208), and an analyzer algorithm A (e.g., analyzer 210). A randomizer algorithm 204 can receive a user's private data 202 as input and produce a plurality of messages 206 (also referred to herein as a "multiset") based on the private data. For instance, some example aspects of the present disclosure generally relate to the randomizer algorithm 204. The shuffler algorithm 208 can receive a plurality of multisets 206 and shuffle and/or permute the plurality of multisets 206 to produce a plurality of shuffled multisets, or, in other words, a uniform random permutation of the input multisets.

The analyzer algorithm 210 can receive the plurality of shuffled multisets and output some desired output 212 from the plurality of shuffled multisets, such as an aggregate of the private data, without knowing the exact private data. Additionally, some example aspects of the present disclosure can relate to the analyzer algorithm 210. In the shuffled model, it is generally assumed that the randomizer 204 and shuffler 208 are trustworthy, while analyzer 210 may not necessarily be trustworthy. In other words, the privacy in the shuffled model can be guaranteed with respect to the input to the analyzer 210, i.e. the output of the shuffler 208.

Aspects of the present disclosure are generally related to the randomizer algorithm 204 and/or the analyzer algorithm 208. Generally, any suitable shuffler algorithm 206 can be employed in accordance with the present disclosure. For instance, the shuffler algorithm 206 can be implemented according to any suitable shuffling algorithm, such as, but not limited to, onion routing, mixnets, third-party servers, and/or secure hardware, or combination thereof, in accordance with the present disclosure.

Example Methods

Figure 6:
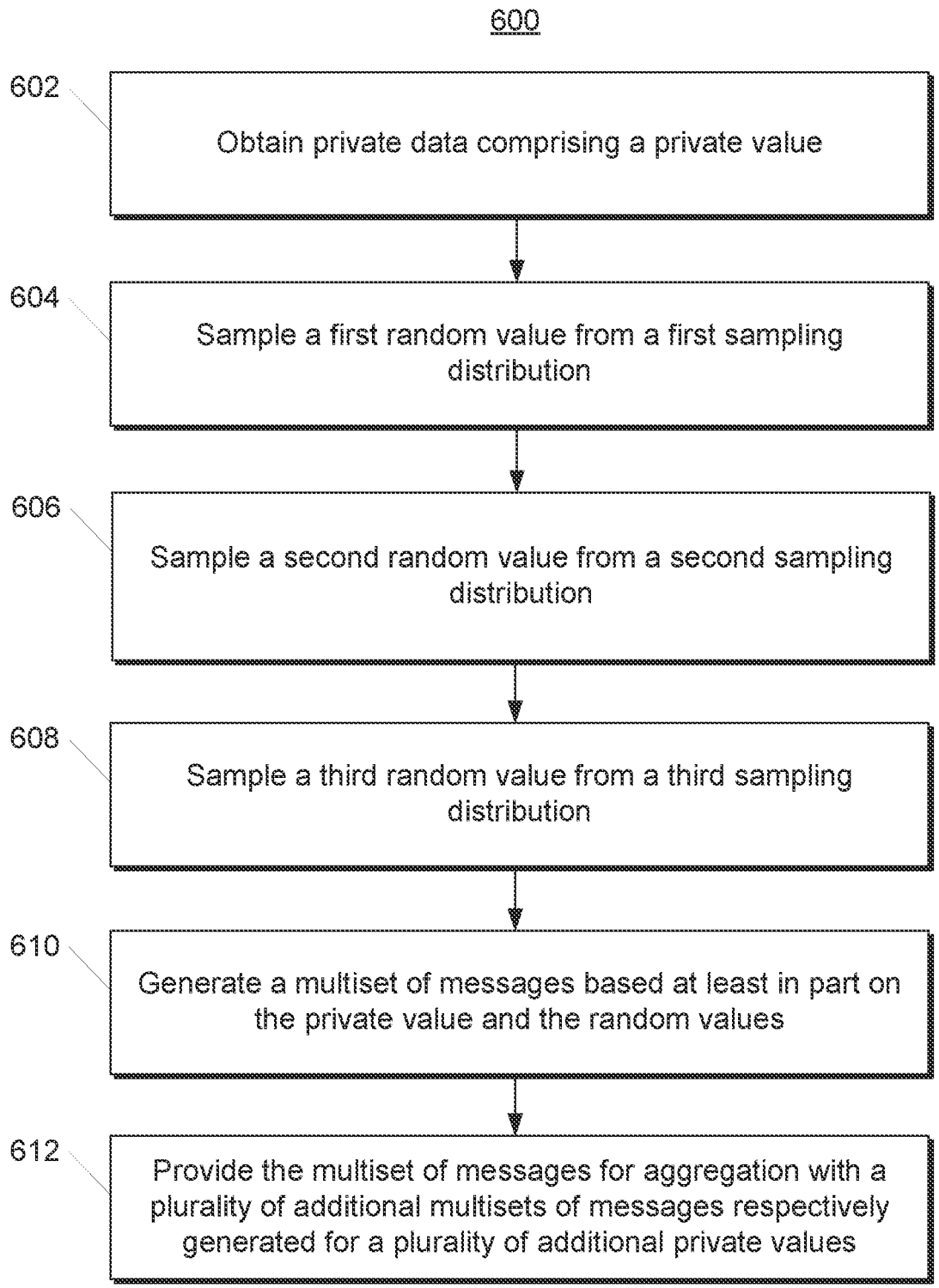
FIG. 6 depicts a flow chart diagram of an example method to enable privacy-preserving aggregation of data according to example embodiments of the present disclosure.

FIG. 6 depicts a flow chart diagram of an example method 600 to enable privacy-preserving aggregation of data according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 includes, at 602, obtaining, by one or more computing devices, private data comprising a private value. The method 600 includes, at 604, sampling, by the one or more computing devices, a first random value from a first sampling distribution, wherein the first sampling distribution is a base distribution of a first infinitely divisible distribution. The method 600 includes, at 606, sampling, by the one or more computing devices, a second random value from a second sampling distribution, wherein the second sampling distribution is a base distribution of a second infinitely divisible distribution. The method 600 includes, at 608, sampling, by the one or more computing devices, a third random value from a third sampling distribution, wherein the third sampling distribution is a base distribution of a third infinitely divisible distribution. The method 600 includes, at 610, generating, by the one or more computing devices, a multiset of messages based at least in part on the private value, the first random value, the second random value, and the third random value, wherein the multiset of messages comprises a first number of increment messages equal to a sum of the private value, the first random value, and the third random value, and wherein the multiset of messages comprises a second number of decrement messages equal to a sum of the second random value and the third random value. The method 600 includes, at 612, providing, by the one or more computing devices, the multiset of messages for aggregation with a plurality of additional multisets of messages respectively generated for a plurality of additional private values.

Figure 7:
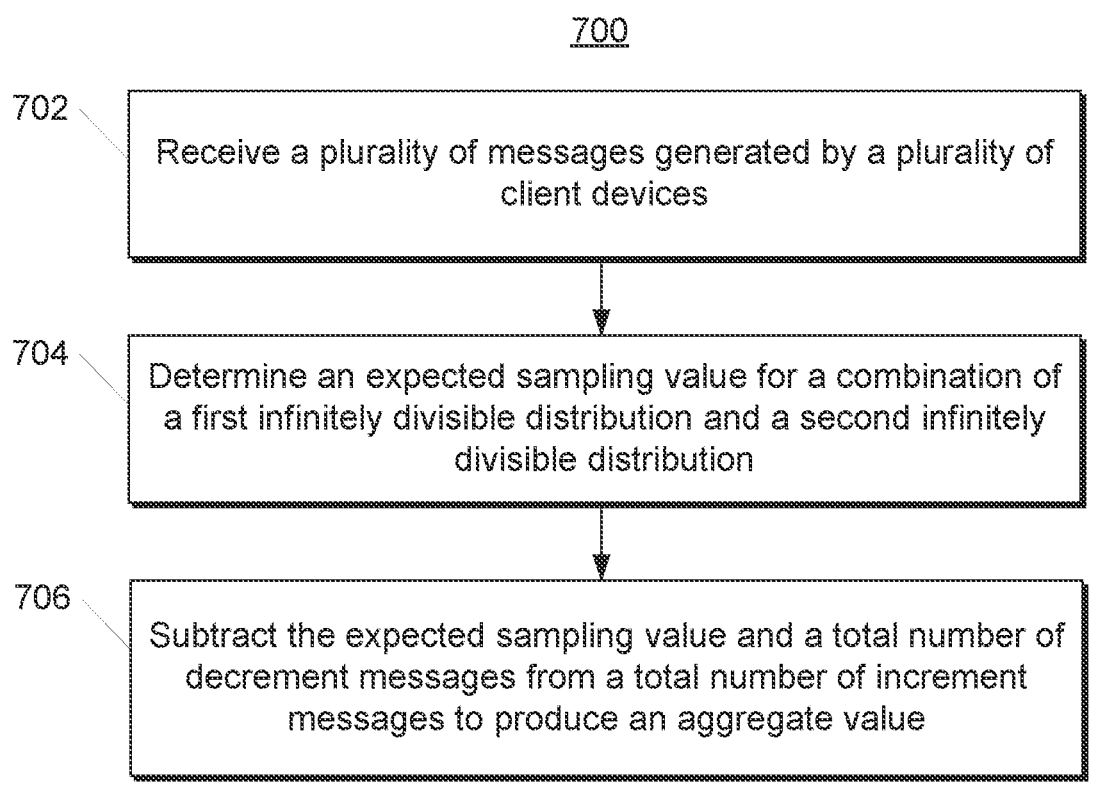
FIG. 7 depicts a flow chart diagram of an example method for performing aggregation of private values according to example embodiments of the present disclosure.

FIG. 7 depicts a flow chart diagram of an example method 700 for performing aggregation of private values according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The method 700 includes, at 702, receiving a plurality of messages generated by a plurality of client devices, wherein the plurality of messages comprise a total number of increment messages and a total number of decrement messages, wherein a respective device-specific number of the increment messages generated by each client device is equal to a sum of a respective first random value sampled by the client device from a respective first sampling distribution, a respective third sampling value sampled by the client device from a respective third sampling distribution, and a respective private value known by the client device, wherein a respective device-specific number of the increment messages generated by each client device is equal to a sum of a respective second random value sampled from a respective second sampling distribution and the respective third random value, and wherein, for each client device, each of the respective first, second, and third sampling distributions is a respective base distribution of a first infinitely divisible distribution, a second infinitely divisible distribution, and a third infinitely divisible distribution. The method 700 includes, at 704, determining an expected sampling value for a combination of the first infinitely divisible distribution and the second infinitely divisible distribution. The method 700 includes, at 706, subtracting the expected sampling value and the total number of decrement messages from the total number of increment messages to produce an aggregate value.

Figure 8:
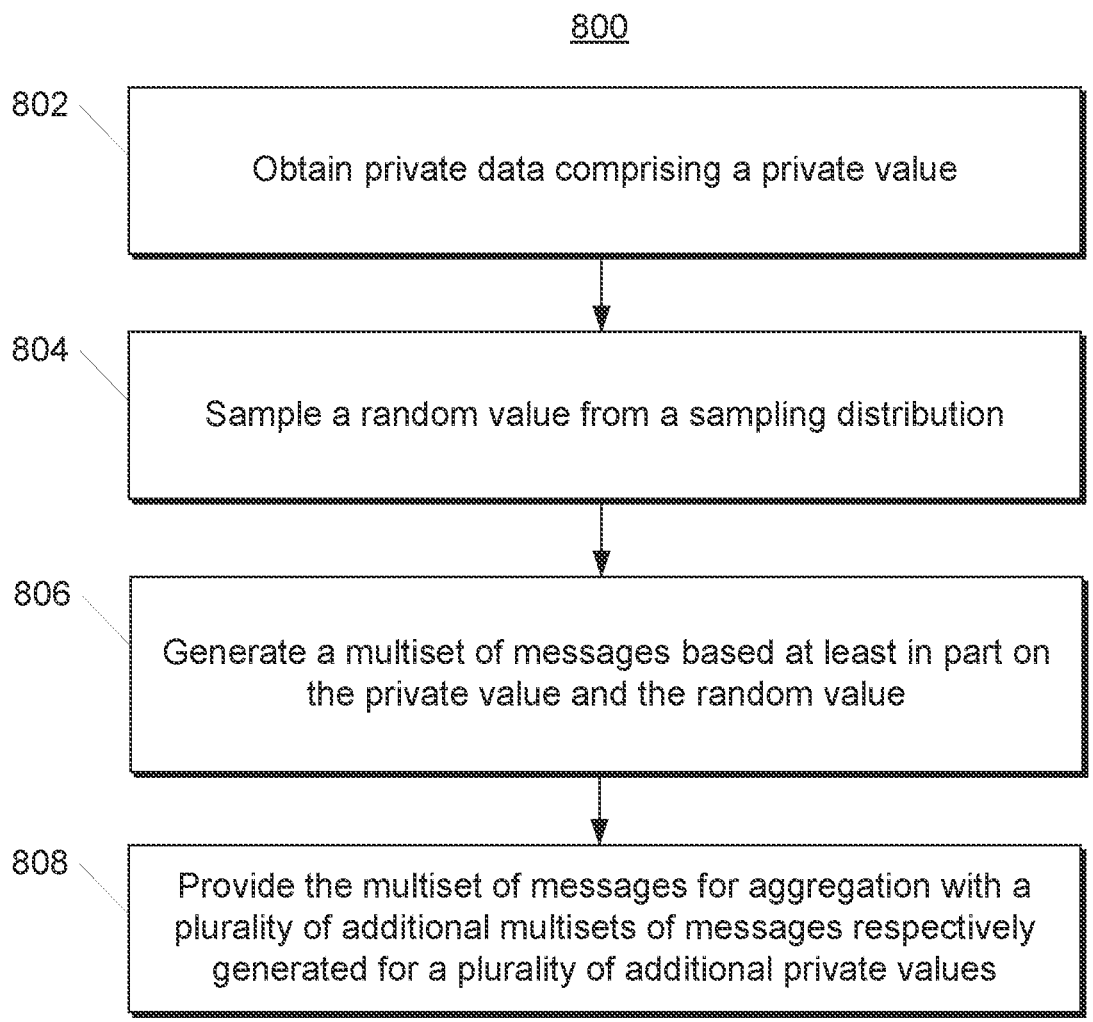
FIG. 8 depicts a flow chart diagram of an example method to enable privacy-preserving aggregation of data according to example embodiments of the present disclosure.

FIG. 8 depicts a flow chart diagram of an example method 800 to enable privacy-preserving aggregation of data according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The method 800 includes, at 802, obtaining, by one or more computing devices, private data comprising a private value. The method 800 includes, at 804, sampling, by the one or more computing devices, a random value from a sampling distribution, wherein the sampling distribution comprises a base distribution of an infinitely divisible distribution. The method 800 includes, at 806, generating, by the one or more computing devices, a multiset of messages based at least in part on the private value and the random value, wherein the multiset of messages comprises a number of increment messages equal to a sum of the private value and the random value. The method 800 includes, at 808, providing, by the one or more computing devices, the multiset of messages for aggregation with a plurality of additional multisets of messages respectively generated for a plurality of additional private values.

Figure 9:
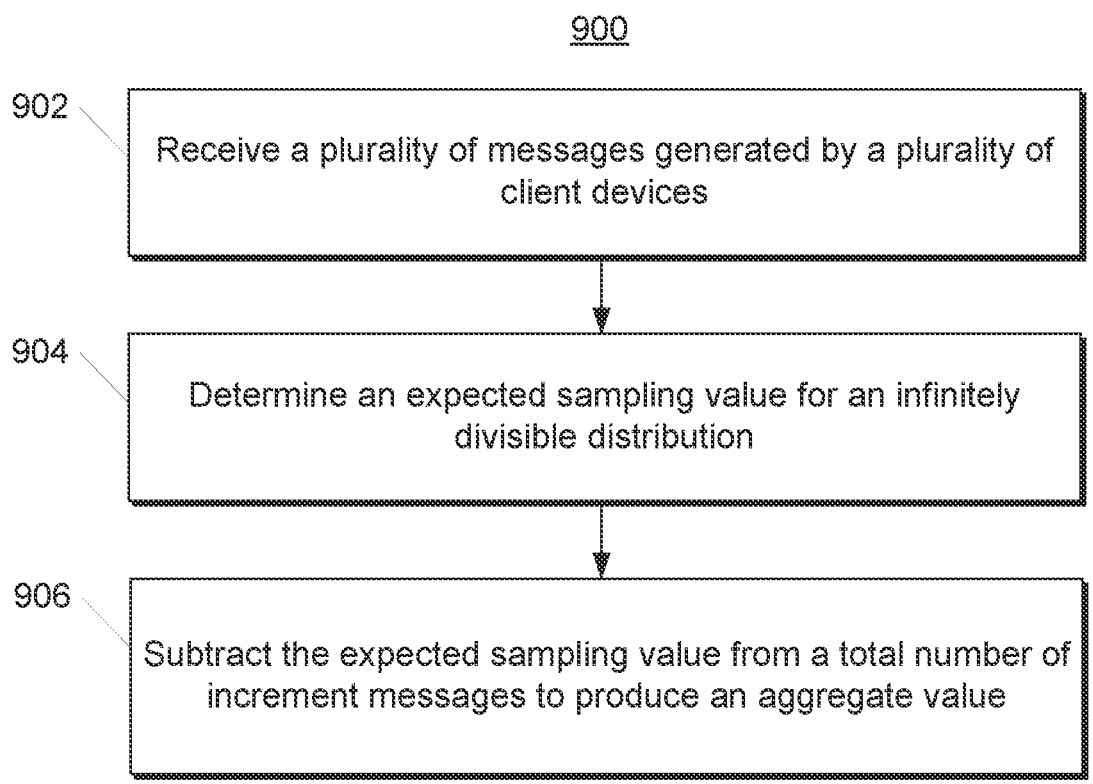
FIG. 9 depicts a flow chart diagram of an example method for performing aggregation of private values according to example embodiments of the present disclosure.

FIG. 9 depicts a flow chart diagram of an example method 900 for performing aggregation of private values according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

The method 900 includes, at 902, receiving a plurality of messages generated by a plurality of client devices, wherein the plurality of messages comprise a total number of increment messages, wherein a respective device-specific number of the increment messages generated by each client device is equal to a sum of a respective random value sampled by the client device from a respective sampling distribution and a respective private value known by the client device, and wherein, for each client device, the respective sampling distribution is a respective base distribution of an infinitely divisible distribution. The method 900 includes, at 904, determining an expected sampling value for the infinitely divisible distribution. The method 900 includes, at 906, subtracting the expected sampling value from the total number of increment messages to produce an aggregate value.

Figure 10:
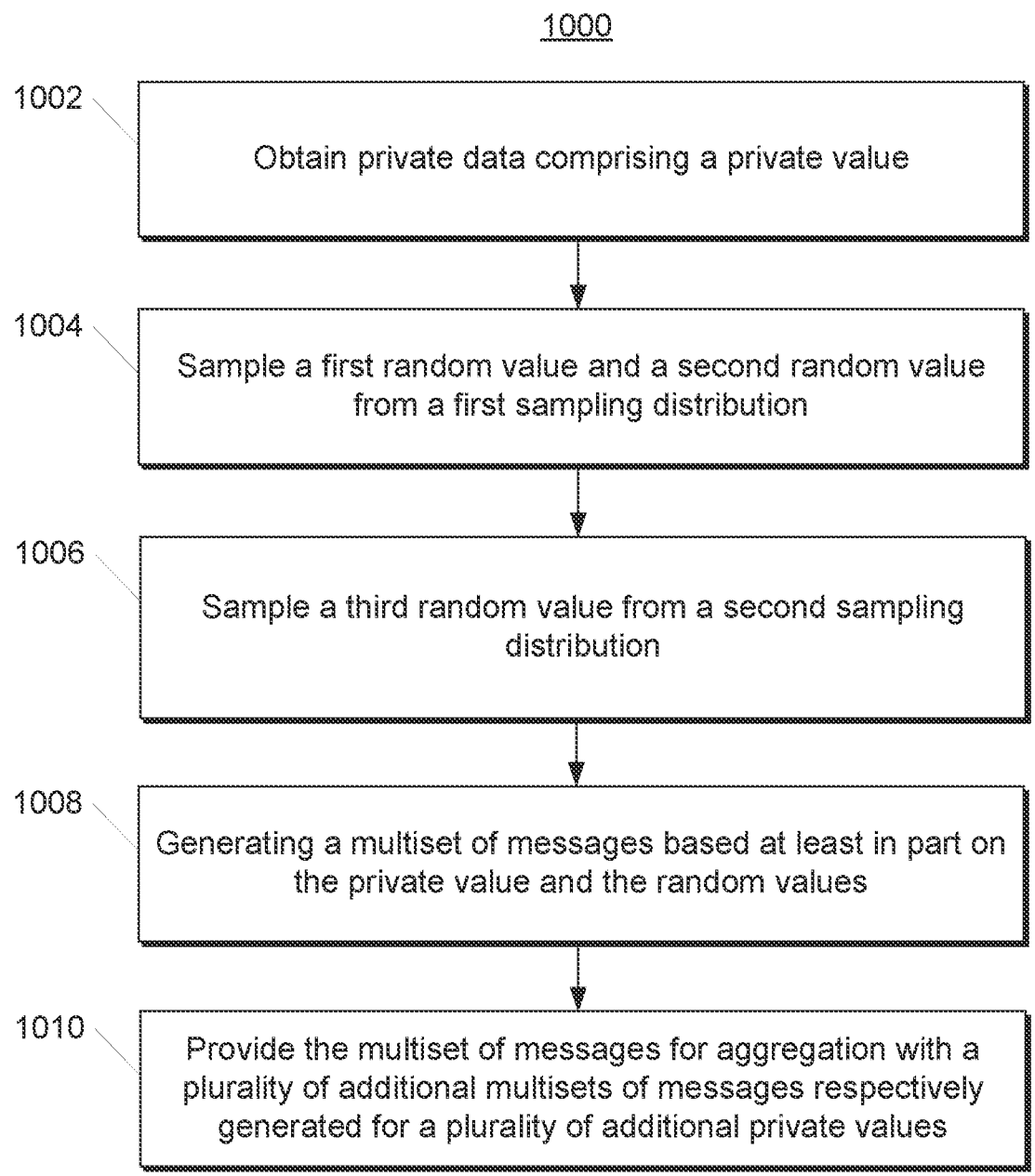
FIG. 10 depicts a flow chart diagram of an example method to enable privacy-preserving aggregation of data according to example embodiments of the present disclosure.

FIG. 10 depicts a flow chart diagram of an example method 900 to enable privacy-preserving aggregation of data according to example embodiments of the present disclosure. Although FIG. 10 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

The method 1000 includes, at 1002, obtaining, by one or more computing devices, private data comprising a private value. The method 1000 includes, at 1004, sampling, by the one or more computing devices, a first random value and a second random value from a first sampling distribution, wherein the first sampling distribution is a base distribution of a first infinitely divisible distribution. The method 1000 includes, at 1006, sampling, by the one or more computing devices, a third random value from a second sampling distribution, wherein the second sampling distribution is a base distribution of a second infinitely divisible distribution. The method 1000 includes, at 1008, generating, by the one or more computing devices, a multiset of messages based at least in part on the private value, the first random value, the second random value, and the third random value, wherein the multiset of messages comprises a first number of increment messages equal to the first random value, wherein the multiset of messages comprises a second number of decrement messages equal to the second random value, and wherein the multiset of messages comprises a third number of zero sum noise messages. The method 1000 includes, at 1010, providing, by the one or more computing devices, the multiset of messages for aggregation with a plurality of additional multisets of messages respectively generated for a plurality of additional private values. In some implementations, the first sampling distribution subtracted from itself comprises a Discrete Laplace distribution. In some implementations, the second sampling distribution comprises a negative binomial distribution. In some implementations, the first number of increment messages and the second number of decrement messages have a sum equal to Discrete Laplacian noise. In some implementations, the private value comprises an integer value in a range from zero to a maximum user value. In some implementations, the zero sum noise messages are selected from a multiset such that values of the multiset are bounded by the maximum user value and such that the sum of all values in the multiset is equal to zero. In some implementations, a plurality of zero sum noise messages can be generated. Additionally and/or alternatively, each of the plurality of zero sum noise messages can be generated based at least in part on an independent random variable.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to enable privacy-preserving aggregation of data, the method comprising:
obtaining, by one or more computing devices, private data comprising a private value associated with a client device;
sampling, by the one or more computing devices, a first random value from a first sampling distribution associated with the client device, wherein the first sampling distribution is a base distribution of a first infinitely divisible distribution;
sampling, by the one or more computing devices, a second random value from a second sampling distribution, wherein the second sampling distribution is a base distribution of a second infinitely divisible distribution;
sampling, by the one or more computing devices, a third random value from a third sampling distribution, wherein the third sampling distribution is a base distribution of a third infinitely divisible distribution;
generating, by the one or more computing devices, a multiset of messages for the client device based at least in part on the private value, the first random value, the second random value, and the third random value, wherein the multiset of messages comprises a first number of increment messages equal to a sum of the private value, the first random value, and the third random value, and wherein the multiset of messages comprises a second number of decrement messages equal to a sum of the second random value and the third random value; and
transmitting, by the one or more computing devices over a network, the multiset of messages for differentially private aggregation with a plurality of additional multisets of messages respectively generated for a plurality of additional private values respectively associated with a plurality of additional client devices;
wherein the first infinitely divisible distribution is shared among the plurality of additional client devices.

2. The computer-implemented method of claim 1, wherein a combination of the first infinitely divisible distribution and the second infinitely divisible distribution produces a combined distribution that has both positive and negative support.

3. The computer-implemented method of claim 2, wherein the combination of the first infinitely divisible distribution and the second infinitely divisible distribution comprises a difference between the first infinitely divisible distribution and the second infinitely divisible distribution.

4. The computer-implemented method of claim 2, wherein the combined distribution comprises a Discrete Laplace distribution.

5. The computer-implemented method of claim 1, wherein the first infinitely divisible distribution is equal to the second infinitely divisible distribution.

6. The computer-implemented method of claim 1, wherein one or more of the first infinitely divisible distribution, the second infinitely divisible distribution, and the third infinitely divisible distribution respectively comprise respective negative binomial distributions.

7. The computer-implemented method of claim 1, wherein one or more of the first infinitely divisible distribution, the second infinitely divisible distribution, and the third infinitely divisible distribution respectively comprise Poisson distributions.

8. The computer-implemented method of claim 1, further comprising repeating the method of any preceding claim for at least a subset of an ordered plurality of private values, wherein a respective index value for each private value in the subset of the ordered plurality of private values is concatenated onto each message of the multiset of messages generated for such private value.

9. The computer-implemented method of claim 8, wherein the method further comprises randomly selecting the number of private values included in the subset of the ordered plurality of private values from a fourth sampling distribution.

10. The computer-implemented method of claim 8, wherein repeating the method of any preceding claim for at least the subset of an ordered plurality of private values comprises repeating, computationally in parallel, the method of any preceding claim for each private value in at least the subset of an ordered plurality of private values.

11. The computer-implemented method of claim 1, wherein the private value is a binary value.

12. A computer-implemented method to enable privacy-preserving aggregation of data, the method comprising:
obtaining, by one or more computing devices, private data comprising a private value associated with a client device;
sampling, by the one or more computing devices, a random value from a sampling distribution associated with the client device, wherein the sampling distribution comprises a base distribution of an infinitely divisible distribution;
generating, by the one or more computing devices, a multiset of messages for the client device based at least in part on the private value and the random value, wherein the multiset of messages comprises a number of increment messages equal to a sum of the private value and the random value; and
transmitting, by the one or more computing devices over a network, the multiset of messages for differentially private aggregation with a plurality of additional multisets of messages respectively generated for a plurality of additional private values respectively associated with a plurality of additional client devices;
wherein the infinitely divisible distribution is shared among the plurality of additional client devices.

13. The computer-implemented method of claim 12, wherein the infinitely divisible distribution comprises a Poisson distribution.

14. The computer-implemented method of claim 12, wherein the infinitely divisible distribution comprises a negative binomial distribution.

15. A computer-implemented method to enable privacy-preserving aggregation of data, the method comprising:
obtaining, by one or more computing devices, private data comprising a private value associated with a client device;
sampling, by the one or more computing devices, a first random value and a second random value from a first sampling distribution associated with the client device, wherein the first sampling distribution is a base distribution of a first infinitely divisible distribution;
sampling, by the one or more computing devices, a third random value from a second sampling distribution, wherein the second sampling distribution is a base distribution of a second infinitely divisible distribution;

generating, by the one or more computing devices, a multiset of messages for the client device based at least in part on the private value, the first random value, the second random value, and the third random value, wherein the multiset of messages comprises a first number of increment messages equal to the first random value, wherein the multiset of messages comprises a second number of decrement messages equal to the second random value, and wherein the multiset of messages comprises a third number of zero sum noise messages; and transmitting, by the one or more computing devices over a network, the multiset of messages for differentially private aggregation with a plurality of additional multisets of messages respectively generated for a plurality of additional private values respectively associated with a plurality of additional client devices;

wherein the first infinitely divisible distribution is shared among the plurality of additional client devices.

16. The computer-implemented method of claim 15, wherein the first sampling distribution subtracted from itself comprises a Discrete Laplace distribution.

17. The computer-implemented method of claim 15, wherein the second sampling distribution comprises a negative binomial distribution.

18. The computer-implemented method of claim 15, wherein the first number of increment messages and the second number of decrement messages have a sum equal to Discrete Laplacian noise.

19. The computer-implemented method of claim 15, wherein the private value comprises an integer value in a range from zero to a maximum user value.

20. The computer-implemented method of claim 19, wherein the zero sum noise messages are selected from a multiset such that values of the multiset are bounded by the maximum user value and such that the sum of all values in the multiset is equal to zero.

* * * * *